(12) United States Patent
Soriaga et al.

(10) Patent No.: US 11,757,599 B2
(45) Date of Patent: *Sep. 12, 2023

(54) LIMITS ON QUANTITY OF DOWNLINK CONTROL INFORMATION (DCI) PROCESSED

(71) Applicant: QUALCOMM Incorporated, San Diego, CA (US)

(72) Inventors: Joseph Binamira Soriaga, San Diego, CA (US); Huilin Xu, Temecula, CA (US); Heechoon Lee, San Diego, CA (US); Peter Pui Lok Ang, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,017

(22) Filed: Dec. 1, 2021

(65) Prior Publication Data

US 2022/0094511 A1 Mar. 24, 2022

Related U.S. Application Data

(63) Continuation of application No. 16/584,169, filed on Sep. 26, 2019, now Pat. No. 11,212,062.

(60) Provisional application No. 62/739,061, filed on Sep. 28, 2018.

(51) Int. Cl.
*H04L 5/00* (2006.01)
*H04W 72/04* (2023.01)
*H04L 1/16* (2023.01)
*H04L 1/1607* (2023.01)
(Continued)

(52) U.S. Cl.
CPC .......... *H04L 5/0094* (2013.01); *H04L 1/1642* (2013.01); *H04L 5/001* (2013.01); *H04W 72/0446* (2013.01); *H04W 72/23* (2023.01)

(58) Field of Classification Search
CPC ............ H04W 72/042; H04W 72/0446; H04L 1/1642; H04L 5/0094; H04L 5/001
See application file for complete search history.

(56) References Cited

U.S. PATENT DOCUMENTS

| 9,232,517 | B2 * | 1/2016 | Kim ..................... H04L 5/1469 |
| 9,491,749 | B2 | 11/2016 | Takeda et al. |
| 10,638,469 | B2 | 4/2020 | Hosseini et al. |

(Continued)

OTHER PUBLICATIONS

"Qualcomm, 3GPP TSG RAN WGI,#91, R1-1720678, Nov. 18, 2017, pp. 2-5" (Year: 2017).*

(Continued)

*Primary Examiner* — Rasheed Gidado
(74) *Attorney, Agent, or Firm* — Patterson & Sheridan, LLP

(57) ABSTRACT

Certain aspects of the present disclosure generally relate to methods and apparatus for downlink control information (DCI) communication and processing. One example method generally includes determining a limit, between a transmission time of a control channel carrying a DCI of a plurality of DCI and a time of an event enabled by the DCI, of a quantity of the plurality of DCI in a frame, generating a frame comprising the plurality of DCI in accordance with the determined limit, and transmitting the frame to a user-equipment (UE).

47 Claims, 10 Drawing Sheets

(51) Int. Cl.
*H04W 72/0446* (2023.01)
*H04W 72/23* (2023.01)

(56) References Cited

U.S. PATENT DOCUMENTS

| | | | | |
|---|---|---|---|---|
| 10,869,311 | B2* | 12/2020 | Jo | .......................... H04L 5/0003 |
| 2014/0086184 | A1 | 3/2014 | Guan et al. | |
| 2016/0366604 | A1* | 12/2016 | Devarasetty | .......... H04L 5/0053 |
| 2018/0062804 | A1 | 3/2018 | Liu et al. | |
| 2018/0115965 | A1 | 4/2018 | Takeda et al. | |
| 2018/0310283 | A1 | 10/2018 | Deenoo et al. | |
| 2019/0104520 | A1 | 4/2019 | Kim et al. | |
| 2019/0124627 | A1 | 4/2019 | Park et al. | |
| 2019/0124631 | A1* | 4/2019 | Ren | ..................... H04W 72/0466 |
| 2019/0150178 | A1 | 5/2019 | Gao et al. | |
| 2020/0106592 | A1 | 4/2020 | Soriaga et al. | |

OTHER PUBLICATIONS

International Search Report and Written Opinion—PCT/US2019/053436—ISA/EPO—dated Dec. 20, 2019.
International Preliminary Report on Patentability—PCT/US2019/053436, The International Bureau of WIPO—Geneva, Switzerland, dated Apr. 8, 2021.
Qualcomm Incorporated: "Discussion on DCI Related Issues", 3GPP Draft; R1-1720678_Dci_Related_Dci_Related_Issues, 3rd Generation Partnership Project (3GPP), Mobile Competence Centre, 650, Route Des Lucioles, F-06921 Sophia-Antipolis Cedex, France, vol. RAN WG1, no. Reno, NV, USA; Nov. 27, 2017-Dec. 1, 2017, Nov. 18, 2017, XP051370139, 6 pages, Retrieved from the Internet: URL: https://www.3gpp.org/ftp/tsg_ran/WG1_RL1/TSGR1_91/Docs/ [retrieved on Nov. 18, 2017] figures 2-1 table 1 sections 1-3.
Qualcomm Incorporated: "Maintenance for Carrier Aggregation and Bandwidth Parts", 3GPP Draft, 3GPP TSG RAN WG1 Meeting #94, R1-1809429, Maintenance for CA BWP, 3rd Generation Partnership Project (3GPP), Mobile Competence Centre, 650, Route Des Lucioles,F-06921 Sophia-Antipolis Cedex, France, vol. RAN WG1, no. Gothenburg, Sweden; Aug. 20, 2018-Aug. 24, 2018, Aug. 24, 2018 (Aug. 24, 2018), XP051516792, 18 Pages, Retrieved from the Internet: URL: http://www.3gpp.org/ftp/tsg%5Fran/WG1%5FRL1/TSGR1%5F94/Docs/R1%2D1809429%2Ezip [retrieved on Aug. 11, 2018] p. 11, Sects 2.1.4, 3.2, lines 27-30 p. 15, lines 9-20, Sections 1-4, paragraph [0002].
Taiwan Search Report—TW108135125—TIPO—dated Oct. 30, 2022.
Taiwan Search Report—TW108135125—TIPO—dated Jun. 9, 2023.

* cited by examiner

LIMITS ON QUANTITY OF DOWNLINK CONTROL INFORMATION (DCI) PROCESSED

CROSS-REFERENCE TO RELATED APPLICATIONS

This application is a continuation of U.S. application Ser. No. 16/584,169, filed Sep. 26, 2019, which claims benefit of U.S. Provisional Patent Application Ser. No. 62/739,061, filed Sep. 28, 2018, which are both assigned to the assignee of the present application and are expressly incorporated by reference in their entireties.

BACKGROUND

Field

Aspects of the present disclosure relate generally to wireless communications systems, and more particularly, to downlink control information (DCI) communication and processing.

Background

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for downlink control information (DCI) communication and processing.

Certain aspects of the present disclosure provide a method for wireless communication. The method generally includes determining a limit, between a transmission time of a control channel carrying a downlink control information (DCI) of a plurality of DCI and a time of an event enabled by the DCI, of a quantity of the plurality of DCI in a frame, generating a frame comprises the plurality of DCI in accordance with the determined limit, and transmitting the frame to a user-equipment (UE).

Certain aspects of the present disclosure provide a method for wireless communication. The method generally includes determining a limit, between a reception time of a control channel carrying a downlink control information (DCI) of the plurality of DCI and a time of an event enabled by the DCI, of a quantity of the plurality of DCI in a frame, receiving a frame comprises the plurality of DCI, and decoding the frame having the plurality of DCI in accordance with the determined limit.

Certain aspects of the present disclosure provide an apparatus for wireless communication. The apparatus generally includes a processing system configured to determine a limit, between a transmission time of a control channel carrying a downlink control information (DCI) of a plurality of DCI and a time of an event enabled by the DCI, of a quantity of the plurality of DCI in a frame, and generate a frame comprises the plurality of DCI in accordance with the determined limit, and a transmitter configured to transmit the frame to a UE.

Certain aspects of the present disclosure provide an apparatus for wireless communication. The apparatus generally includes a processing system configured to determine a limit, between a reception time of a control channel carrying a downlink control information (DCI) of the plurality of DCI and a time of an event enabled by the DCI, of a quantity of the plurality of DCI in a frame, and a receiver configured to receive a frame comprises the plurality of DCI, wherein the processing system is further configured to decode the frame having the plurality of DCI in accordance with the determined limit.

Certain aspects of the present disclosure provide an apparatus for wireless communication. The apparatus generally includes means for determining a limit, between a transmission time of a control channel carrying a downlink control information (DCI) of a plurality of DCI and a time of an event enabled by the DCI, of a quantity of the plurality of DCI in a frame, means for generating a frame comprises the plurality of DCI in accordance with the determined limit, and means for transmitting the frame to a UE.

Certain aspects of the present disclosure provide an apparatus for wireless communication. The apparatus generally includes means for determining a limit, between a reception time of a control channel carrying a downlink control information (DCI) of the plurality of DCI and a time of an event enabled by the DCI, of a quantity of the plurality of DCI in a frame, means for receiving a frame comprises the plurality of DCI, and means for decoding the frame having the plurality of DCI in accordance with the determined limit.

Certain aspects of the present disclosure provide a computer readable medium having instructions stored thereon to cause an apparatus to determine a limit, between a transmission time of a control channel carrying a downlink control information (DCI) of a plurality of DCI and a time of an event enabled by the DCI, of a quantity of the plurality of DCI in a frame, generate a frame comprises the plurality of DCI in accordance with the determined limit, and transmit the frame to a UE.

Certain aspects of the present disclosure provide a computer readable medium having instructions stored thereon to cause an apparatus to determine a limit, between a reception time of a control channel carrying a downlink control information (DCI) of the plurality of DCI and a time of an event enabled by the DCI, of a quantity of the plurality of DCI in a frame, receive a frame comprises the plurality of DCI, and decode the frame having the plurality of DCI in accordance with the determined limit.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
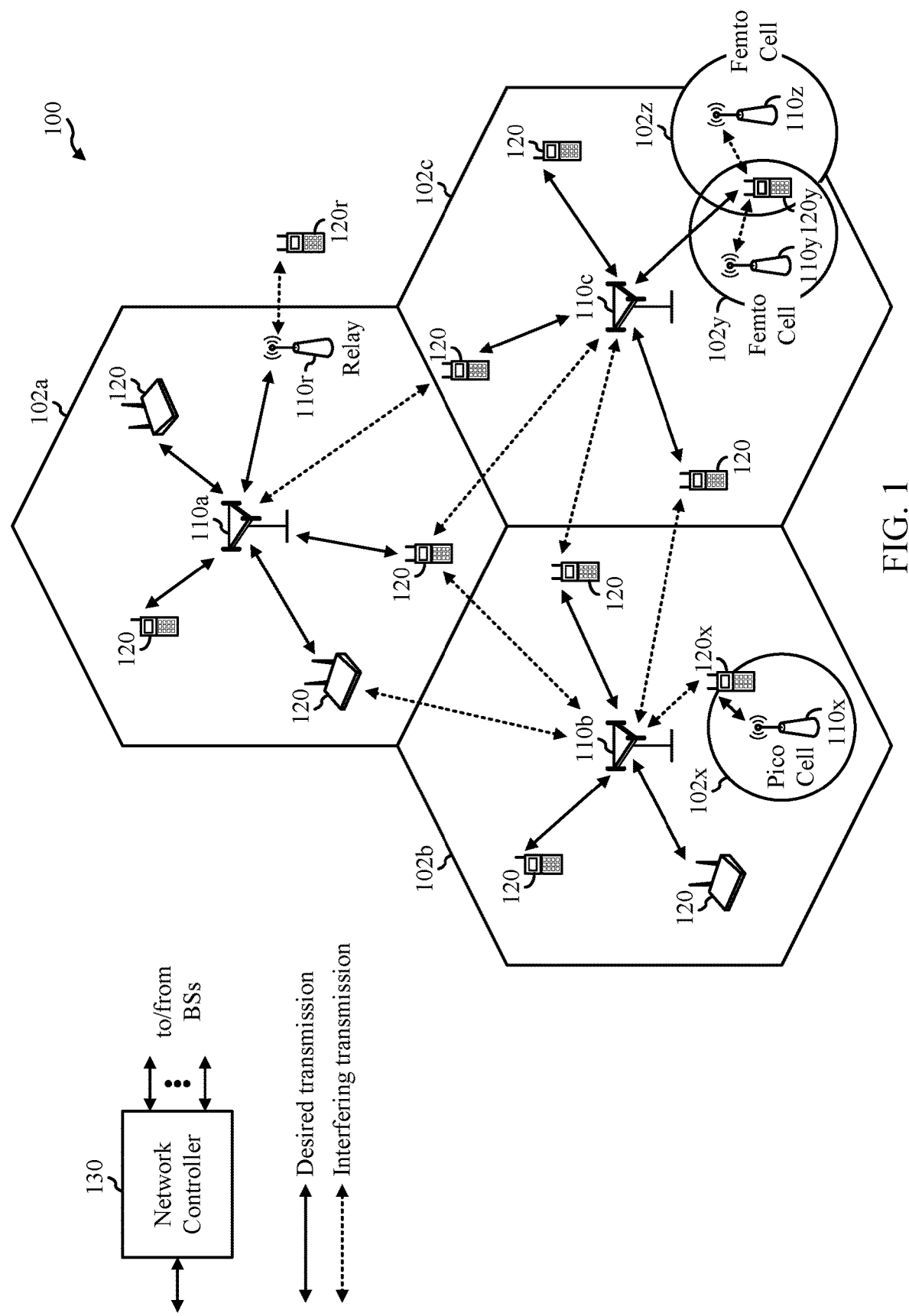
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110a, 110b and 110c may be macro gNBs for the macro cells 102a, 102b and 102c, respectively. The gNB 110x may be a pico gNB for a pico cell 102x. The gNBs 110y and 110z may be femto gNB for the femto cells 102y and 102z, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110r may communicate with the gNB 110a and a UE 120r in order to facilitate communication between the gNB 110a and the UE 120r. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Figure 2:
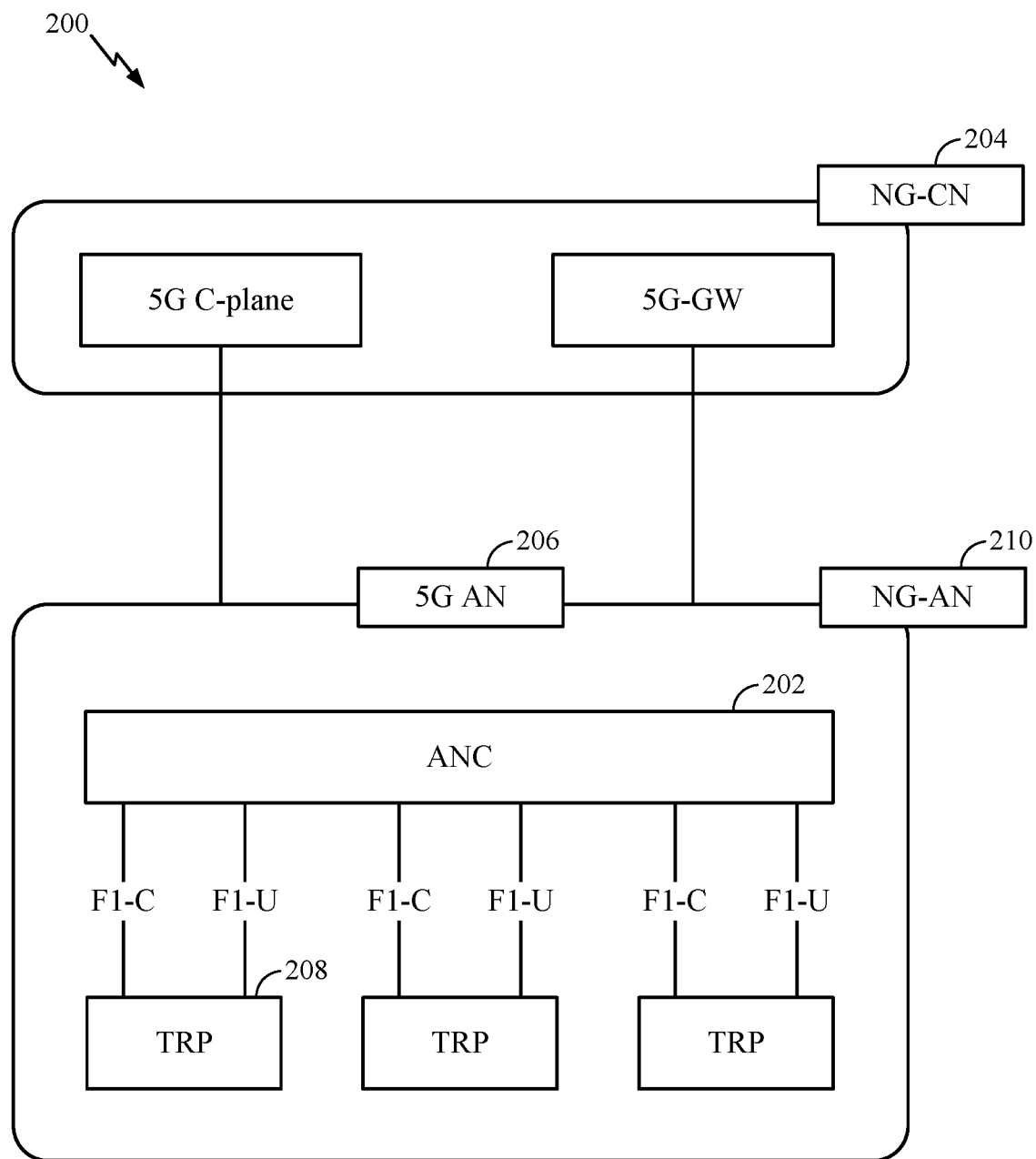
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
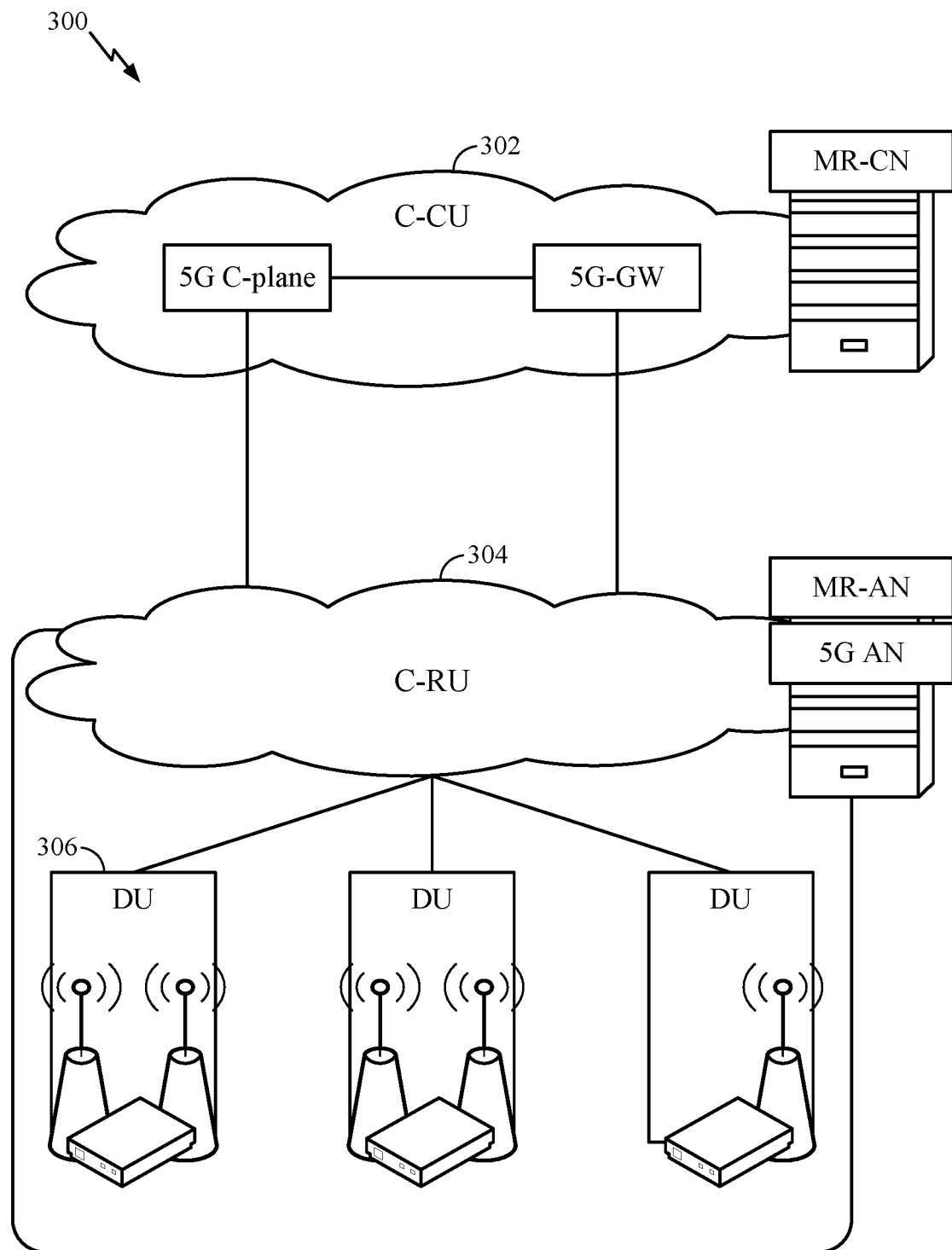
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
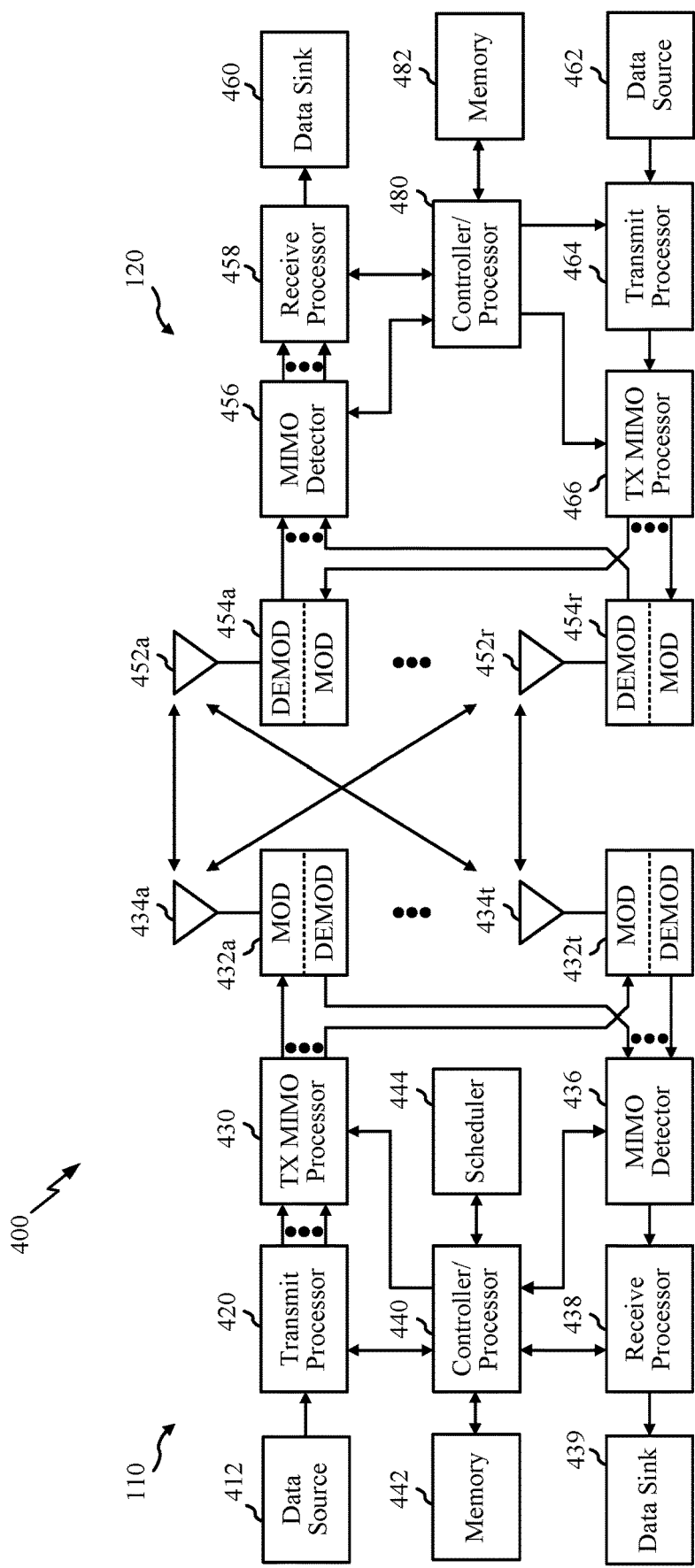
FIG. 4 is a block diagram conceptually illustrating a design of an example base station (BS) and user equipment (UE), in accordance with certain aspects of the present disclosure.

FIG. 4 illustrates example components 400 of the gNB 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the gNB 110 may be used to perform the operations described herein and illustrated with reference to FIGS. 9-11.

FIG. 4 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 434a through 434t, and the UE 120 may be equipped with antennas 452a through 452r.

At the gNB 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the gNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the gNB 110. At the gNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the gNB 110 and the UE 120, respectively. The processor 440 and/or other processors and modules at the gNB 110 may perform or direct, e.g., the execution of various processes for the techniques described herein. The processor 480 and/or other processors and modules at the UE 120 may also perform or direct, e.g., the execution of the functional blocks illustrated in FIGS. 9 and 11, and/or other processes for the techniques described herein. The processor 440 and/or other processors and modules at the gNB 110 may also perform or direct, e.g., the execution of the functional blocks illustrated in FIG. 10, and/or other processes for the techniques described herein. The memories 442, 482 may store data and program codes for the gNB 110 and the UE 120, respectively. A scheduler 444 may schedule UEs for data transmission on the downlink and/or uplink.

Figure 5:
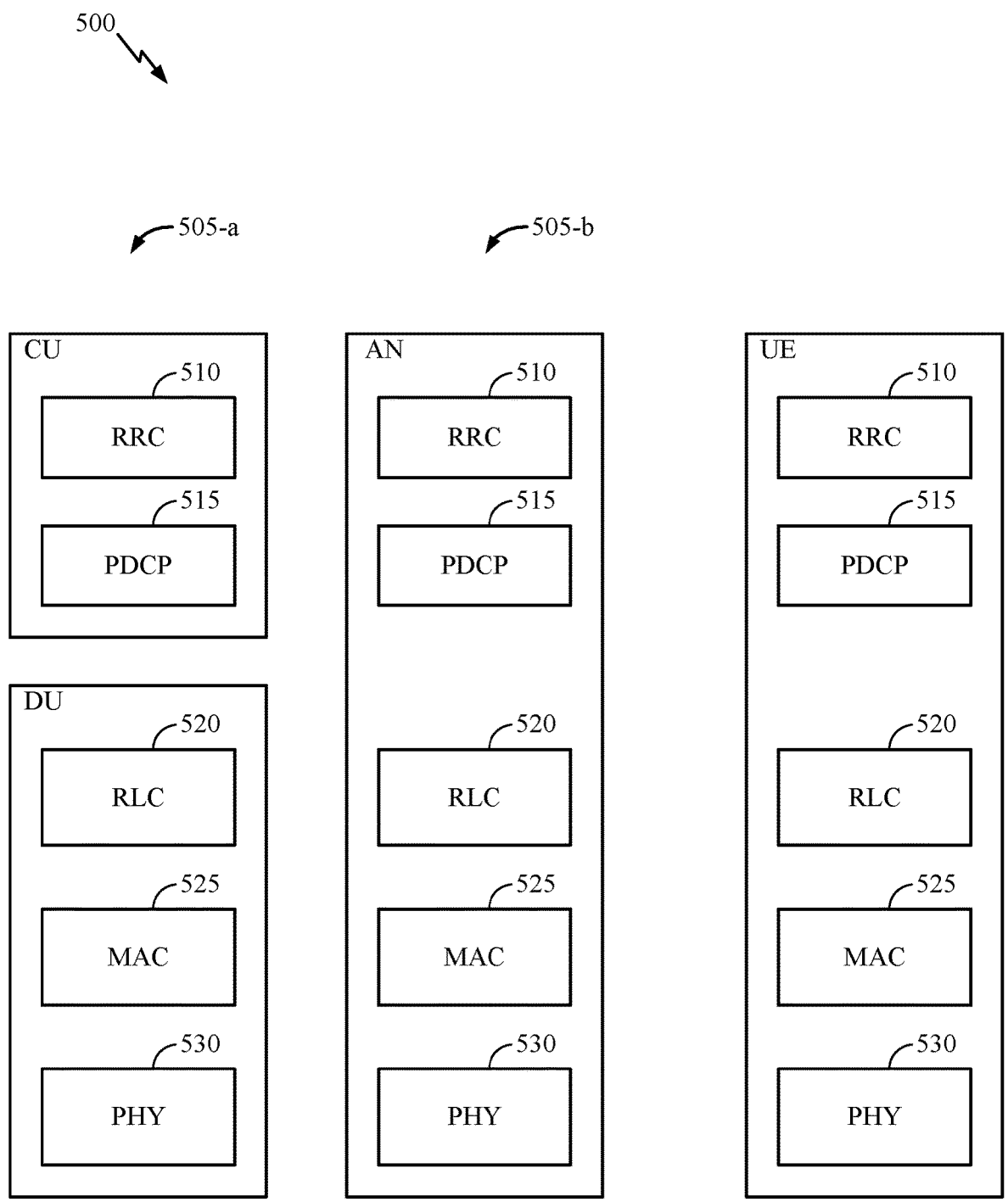
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
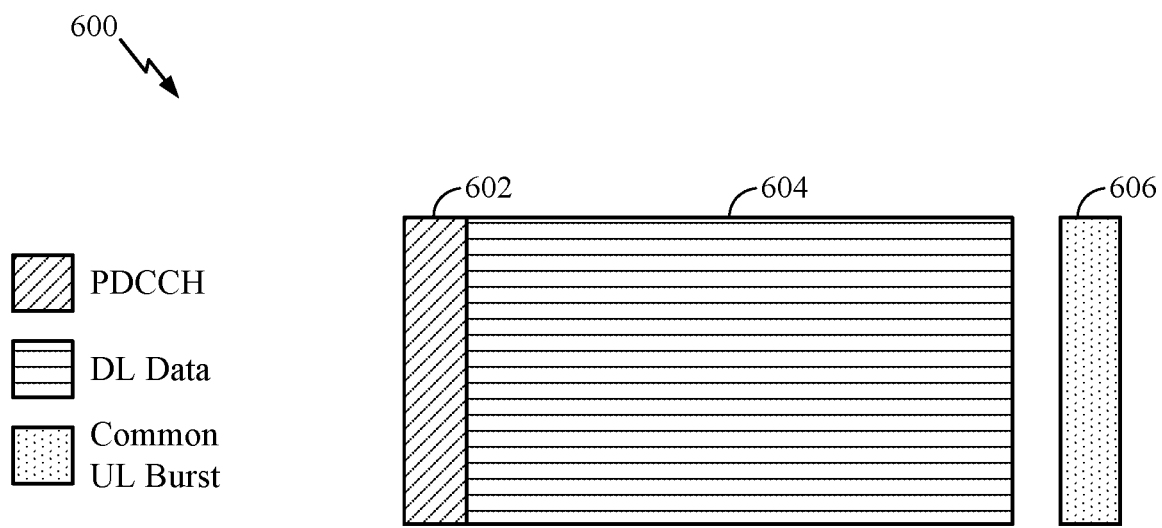
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or gNB) to the subordinate entity (e.g., UE). In some configurations, the DL data portion 604 may be a physical DL shared channel (PDSCH).

The DL-centric subframe 600 may also include a common UL portion 606.

The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
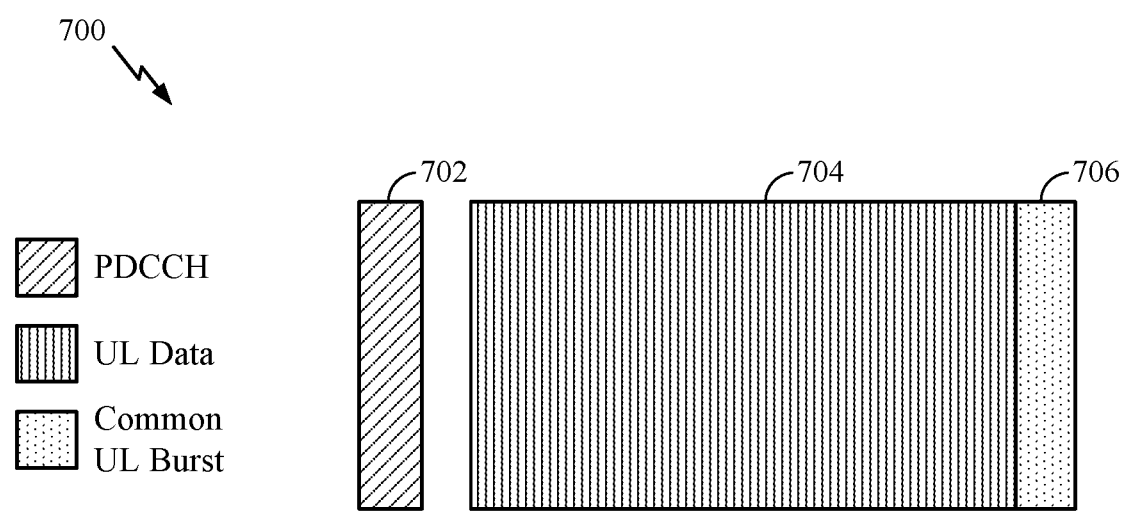
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or gNB). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe 700 and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or gNB), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Aspects of the present disclosure provide apparatus, methods, processing systems, and computer program products for new radio (NR) (new radio access technology or 5G technology). New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service. The RAN may include a central unit (CU) and distributed units (DUs). A NR Node B (e.g., 5G Node B) may correspond to one or multiple transmission reception points (TRPs).

Example Techniques for Limiting a Quantity of Downlink Control Information (DCI) Processed Dynamic scheduling with support for cross-slot scheduling provides a large amount of flexibility. Additionally, large amount of delay between a downlink (DL) grant and the corresponding DL data reception, and delay between uplink (UL) grant reception in DL and UL data transmission for bandwidth part (BWP) switching increases envelope. For example, the longer the delay between the reception of downlink control information (DCI) and the corresponding event enabled by the DCI, the longer the UE will have to store the DCI in a buffer. Moreover, if multiple DCI are received, all the DCI may have to be stored until the corresponding event associated with each DCI.

Figure 8:
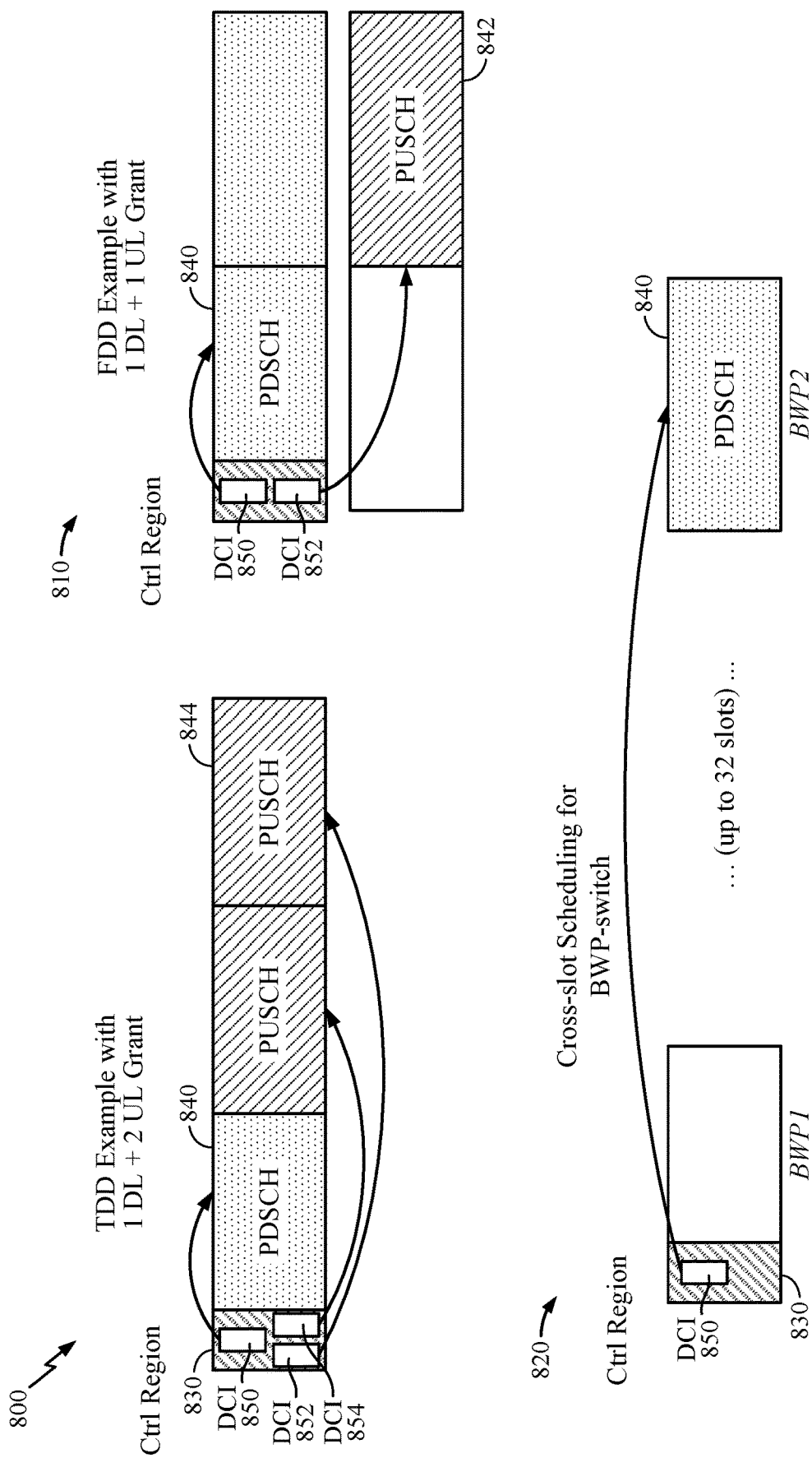
FIG. 8 illustrates example frame structures.

FIG. 8 illustrates example frame structures 800, 810, 820. The frame structure 800 illustrates an example time-division duplex (TDD) protocol with a single DL grant and two UL grants. As illustrated, downlink control information (DCI) 850 may be transmitted in a control (ctrl) region, allocating resources for scheduling a downlink data transmission (PDSCH) 840, and DCI 852, 854 may be transmitted in the control region 830 for scheduling uplink transmissions (PUSCHs) 842, 844.

The frame structure 810 illustrates an example frequency-division duplex (FDD) protocol with 1 DL grant and 1 UL grant. As illustrated, DCI 850 may be transmitted in a control region, allocating resources for downlink data transmission 840 (e.g., PDSCH), and DCI 852 may be transmitted in the control region for uplink transmission 842 (e.g., PUSCH). The PDSCH and the PUSCH may be on different frequency bands, as illustrated.

The frame structure 820 illustrates an example TDD cross-slot scheduling protocol for BWP switching. BWP for NR provides a means of operating UEs with smaller bandwidth, as compared a wide bandwidth configuration, which makes NR an energy efficient solution despite the support of wideband operation. As illustrated by the frame structure 820, DCI 850 may be transmitted in a control region 830 of a first BWP (BWP1), allocating resources for downlink data transmission 840 (e.g., PDSCH) in a second BWP (BWP2).

Figure 9:
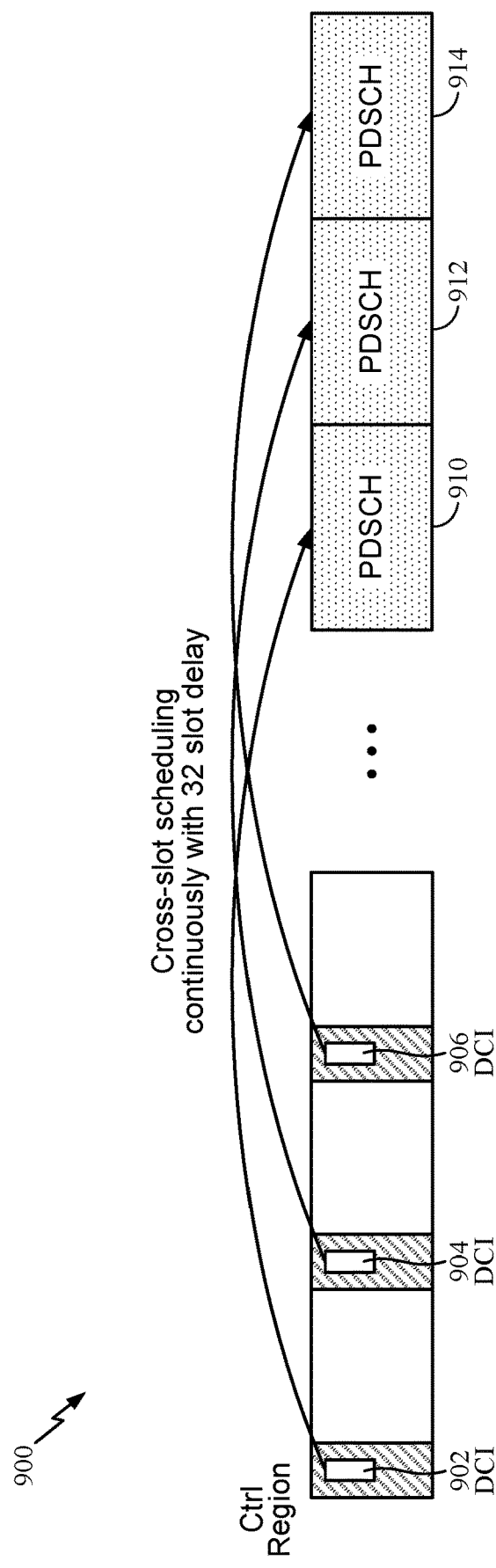
FIG. 9 illustrates an example frame structure for cross-slot scheduling.

FIG. 9 illustrates an example frame structure 900 for cross-slot scheduling continuously with 32 slot delays. As illustrated, multiple DCI 902, 904, 906 (e.g., M DCIs, M being an integer equal to or greater than two) may be transmitted, scheduling respective data transmissions 910, 912, 914. The data transmissions 910, 912, 914 occur after multiple DCI transmissions, and thus the UE may have to store DCI in a buffer. Certain aspects of the present disclosure provide a framework, UE capability, and scaling solution to provide flexibility while limiting implementation burden. Moreover, certain aspects described herein allow blind decoding (BD) limits for UEs. For example, in certain aspects, the number of DCIs that a UE may be required to buffer may be limited. Aspects of the present disclosure provide techniques that allow for a UE to not be expected to simultaneously process the M DCI, where the processing is measured from the reception of PDCCH carrying the DCI to the start of an event or command (e.g., granted transmission such as PDSCH) scheduled by the DCI. For example, in certain aspects, the UE may be expected to handle no more than M DCI within any slot.

Figure 10:
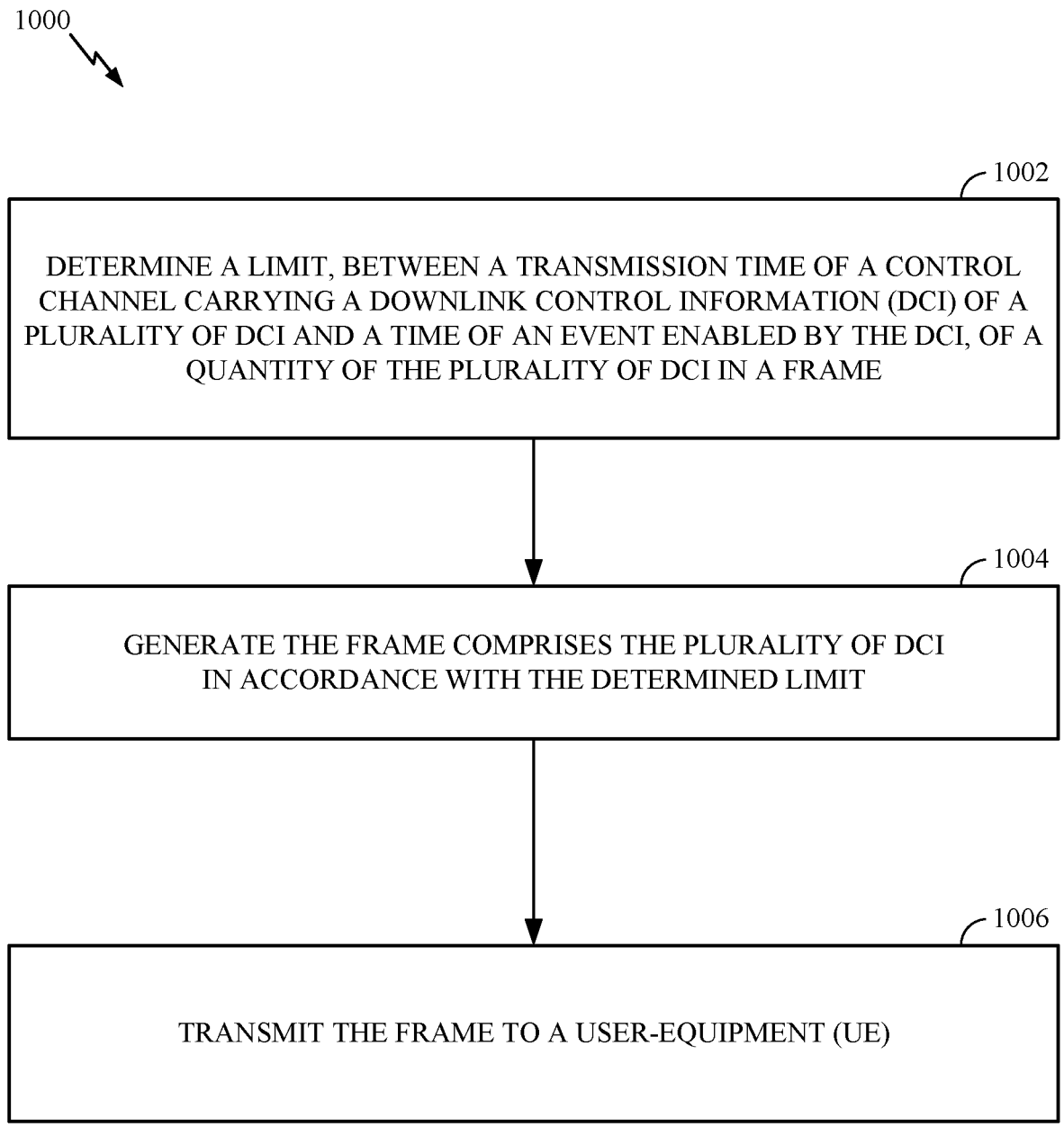
FIG. 10 illustrates example operations for wireless communication by a base station, in accordance with certain aspects of the present disclosure.

FIG. 10 illustrates example operations 1000 for wireless communication, in accordance with certain aspects of the present disclosure. The operations 1000 may be performed, for example, by a base station, such as the base station 110.

Operations 1000 may be implemented as software components that are executed and run on one or more processors (e.g., controller/processor 440 of FIG. 4). Further, the transmission and reception of signals by the BS in operations 1000 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

The operations 1000 begin, at block 1002, by the base station determining a limit, between a transmission time of a control channel carrying a downlink control information (DCI) of a plurality of DCI and a time of an event enabled by the DCI, of a quantity of the plurality of DCI in a frame. At block 1004, the base station generates a frame comprises the plurality of DCI in accordance with the determined limit, and at block 1006, transmits the frame to a user-equipment (UE).

Figure 11:
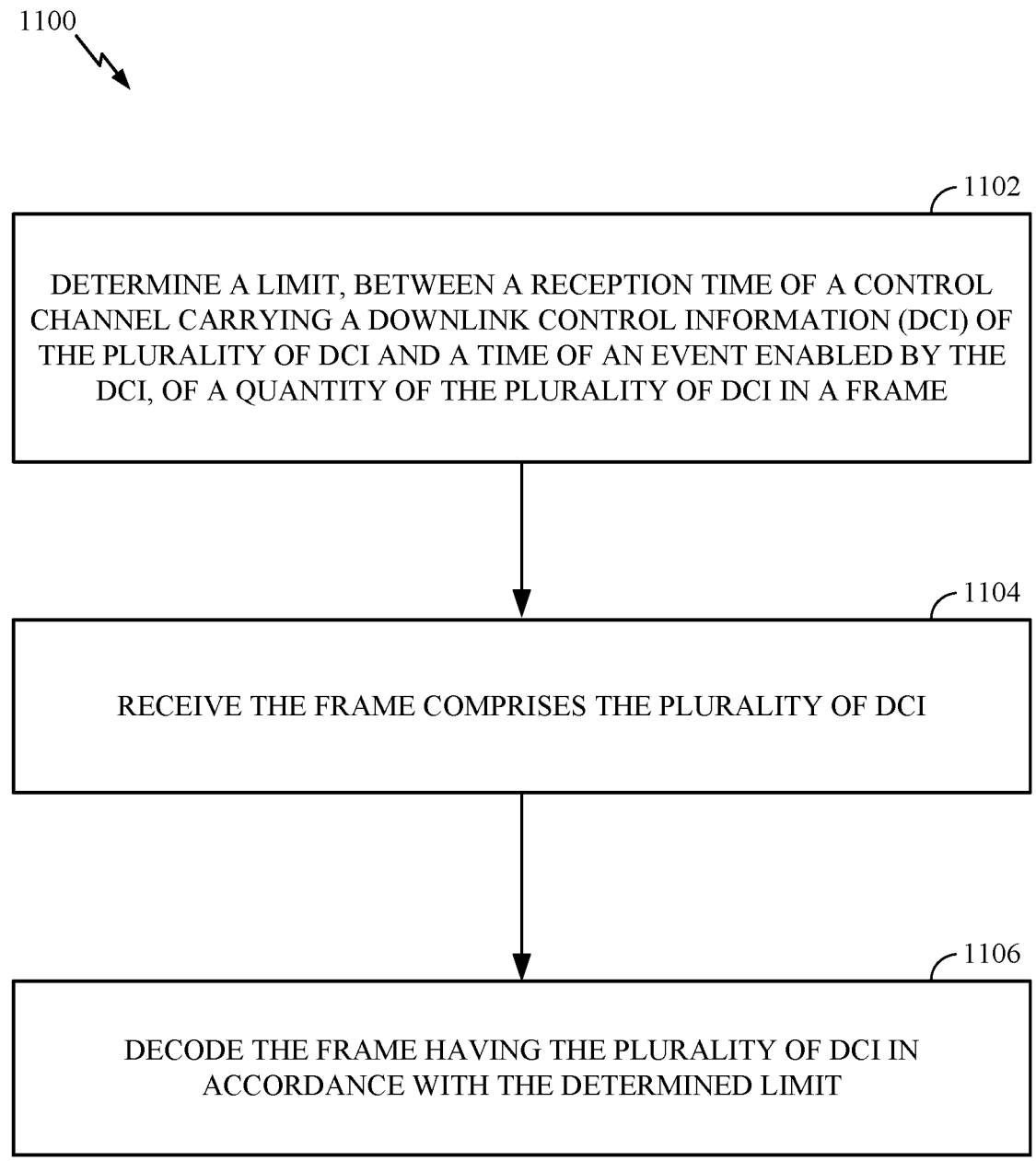
FIG. 11 illustrates example operations for wireless communication by a UE, in accordance with certain aspects of the present disclosure.

FIG. 11 illustrates example operations 1100 for wireless communication, in accordance with certain aspects of the present disclosure. The operations 1100 may be performed, for example, by a UE, such as the UE 120. The operations 1100 correspond to the operations 1000, but from the perspective of the UE 120.

The operations 1100 may be complimentary operations by the UE to the operations 1100 performed by the BS. Operations 1100 may be implemented as software components that are executed and run on one or more processors (e.g., controller/processor 480 of FIG. 4). Further, the transmission and reception of signals by the UE in operations 1100 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

The operations 1100 begin, at block 1102, by the UE determining a limit, between a reception time of a control channel carrying a downlink control information (DCI) of the plurality of DCI and a time of an event enabled by the DCI, of a quantity of the plurality of DCI in a frame. At block 1104, the UE receives a frame comprising the plurality of DCI and at block 1106, decodes the frame having the plurality of DCI in accordance with the determined limit.

In certain aspects, the determination of the limit may be dependent on a communication protocol corresponding to the frame. For example, for a single CC communication protocol, the number of grants may be limited to M within the single CC. In other words, the UE may be expected to process no more than M DCI simultaneously within a single CC. In some cases, M may be equal to 16. In certain aspects, M may be sub-carrier or configuration specific, or fixed to a maximum limit.

If the communication protocol is carrier aggregation (CA) with the same numerology (e.g., the CCs for the CA have the same numerology), the determination of the limit may be based on the product of a variable x (e.g., x being the number of CCs for the CA) and M, if x is less than or equal to a preset threshold (e.g., e.g., 4), or if y is greater than or equal to x, where y is a scaling factor relative to a single CC DCI limit for the UE (e.g., the UE capability scaling factor for total BDs in CA relative to a single CC limit). In other words, the scaling factory may indicate, for a particular UE, the number of BDs the UE is able to perform for CA of multiple CCs, relative the number of BDs the UE is able to perform for a single CC.

In certain aspects, DCI may be split across CCs, subject to the maximum number of DCIs that the UE is capable of processing within a single CC. In certain aspects, the quantity of DCI, between the transmission time of the control channel carrying the DCI of the plurality of DCI and the time of the event enabled by the DCI, may be limited to the product of y and M, if x (e.g., x being the number of CCs for the CA) is greater than a preset threshold (e.g., 4) and y is less than x. Again, the DCI may be split across CCs, subject to the maximum number of DCIs that the UE is capable of processing within a single CC.

Certain aspects of the present disclosure provide limits for the quantity of DCI when the communication protocol is CA with different numerology. For example, for self-scheduling CA with different numerologies, where the number of CCs (e.g., DL CCs) is more than a preset threshold (e.g., 4) and with up to T CCs (e.g., DL-CCs), and where the UE reports PDCCH BD capability of y less than T, the quantity of DCI, between the transmission time of the control channel carrying the DCI and the time of the event enabled by the DCI, may be limited to L DCI per numerology, per slot, L being an integer equal to or greater than 2). The maximum number of DCIs across CCs per numerology may be based on UE BD capability y. The DCIs may be split across CCs for the given numerology, subject to the maximum number of DCIs that the UE is limited to process within a single CC. If a UE is configured with CCs (e.g., DL CCs) of X0 (quantity of CCs with numerology 0), X1 (quantity of CCs with numerology 1), X2 (quantity of CCs with numerology 2), X3 (quantity of CCs with numerology 3), where Xi denotes the number of CCs (e.g., DL CCs) with the numerology i, then L for the CCs (e.g., DL CCs) with the numerology i is given by floor{Xi/(X0+X1+X2+X3)*Mi*y} per slot of the numerology i, where Mi is the maximum number of DCI the UE is limited to process within a single CC for the numerology i, i being an integer equal to or greater than 2.

For self-scheduling CA with different numerologies, where the number of CCs (e.g., DL CCs) is up to 4 or with up to T CCs (e.g., DL CCs), and where the UE reports PDCCH BD capability of y greater than or equal to T, the quantity of DCI, between the transmission of the control channel carrying the DCI and the time of the event enabled by the DCI, may be limited to no more than L DCI per numerology per slot. The quantity L DCI may be split across CCs for the given numerology, subject to the maximum number of DCIs that the UE is limited to process within a single CC. If a UE is configured with CCs (e.g., DL CCs) of X0, X1, X2, X3, where Xi denotes the number of CCs (e.g., DL CCs) with the numerology i, then L for the CCs (e.g., DL CCs) with the numerology i is given by the product of Xi and Mi, per slot of the numerology i, where Mi is the maximum number of DCIs the UE is limited to process within a single CC for numerology i.

Certain aspects of the present disclosure provide limits on DCI for CA mixed numerology. For instance, for CA with cross-carrier scheduled CCs, where at least two CCs have different numerologies, X0, X1, X2, X3 and corresponding T=X0+X1+X2+X3 may be calculated, where Xi denotes the total number of scheduling CCs that have numerology i plus the total number of other CCs scheduled by CCs that have numerology i. For numerology i, the UE may be limited to process no more than L DCI for these Xi CCs (e.g., DL CCs). In certain aspects, L may be equal to floor{Xi/T*Mi*y} per slot of the numerology i, if T is greater than a threshold (e.g., 4) and the UE reports BD capability of y of less than T. In certain aspects, L may be equal to the product of Xi and Mi per slot of the numerology i, if T is less than or equal to a threshold (e.g., 4) or the UE reports BD capability of y greater than or equal to T. In certain aspects, Mi represents the maximum quantity of DCI the UE is limited to process within a single CC per slot specified for numerology i. In certain aspects, the values of Xi may be zero depending on the CA configuration. In certain aspects, the scaling factor y may be a separately signaled UE capability, instead of being equal to the same scaling factor used for obtaining BDs across carriers.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
   determining a limit, between a transmission time of a control channel carrying a downlink control information (DCI) of a plurality of DCI and a time of an event enabled by the DCI, of a quantity of the plurality of DCI in one or more slots based on a configuration associated with transmission of the one or more slots, wherein the event enabled by each of the plurality of DCI is a data transmission, the plurality of DCI scheduling the data transmissions on different channels;
   generating the one or more slots in accordance with the determined limit; and
   transmitting the one or more slots to a user-equipment (UE).

2. The method of claim 1, wherein the determined limit is subcarrier specific.

3. The method of claim 1, wherein the determination of the limit is based on a communication protocol corresponding to the one or more slots.

4. The method of claim 3, wherein the determination of the limit is based on whether the communication protocol corresponding to the one or more slots is single carrier or carrier aggregation (CA).

5. The method of claim 3, wherein the determination of the limit is based on whether the communication protocol is CA with carriers having the same numerology or CA with carriers having different numerologies.

6. The method of claim 5, wherein, if the communication protocol is CA with carriers having the same numerology, the determination of the limit is based on variables X and M, where X is a number of CCs for the CA, and wherein M corresponds to a limit of a quantity of DCI to be processed by the UE for a single component carrier (CC).

7. The method of claim 6, wherein the determination of the limit is based on a product of variables X and M further if X is less than or equal to a threshold, or y is greater than or equal to X, wherein y is a scaling factor relative to a single CC DCI limit for the UE.

8. The method of claim 5, wherein if the communication protocol is CA with carriers having the same numerology, the determination of the limit being based on variables y and M, wherein y is a scaling factor relative to a single CC DCI limit for the UE, and wherein M corresponds to a limit of a quantity of DCI to be processed by the UE for a single CC.

9. The method of claim 8, wherein the determination of the limit is based on a product of y and M if X is greater than a threshold and y is less than X, wherein X is a quantity of CCs for the CA.

10. The method of claim 3, wherein the determination of the limit is based on whether the communication protocol is CA with self-scheduling or CA with cross-carrier scheduling.

11. The method of claim 10, if the communication protocol is CA with self-scheduling, the quantity of the plurality of DCI, between the transmission time of the control channel carrying the DCI and the time of the event enabled by the DCI, is limited to a threshold L per numerology and per slot of the one or more slots.

12. The method of claim 11, wherein the quantity of the plurality of DCI, between the transmission time of the control channel carrying the DCI and the time of the event enabled by the DCI, is limited to the threshold L if a number of CCs of the CA is more than a threshold.

13. The method of claim 12, wherein the quantity of the plurality of DCI, between the transmission time of the control channel carrying the DCI and the time of the event enabled by the DCI, is limited to the threshold L further if the number of CCs is greater than y, wherein y is a scaling factor relative to a single CC DCI limit for the UE.

14. The method of claim 13, wherein the threshold L is determined for each numerology of a plurality of numerologies of carriers for the CA based on a quantity of CCs of the numerology, and a total quantity of CCs for the plurality of numerologies.

15. The method of claim 14, wherein the threshold L, for the numerology i of the plurality of numerologies of carriers for the CA, is equal to Floor $\{Xi/(X0+X1+X2+X3)*Mi*y\}$ per slot of the numerology i, wherein X0 is a quantity of CCs for the CA having numerology 0, wherein X1 is a quantity of CCs for the CA having numerology 1, wherein X2 is a quantity of CCs for the CA having numerology 2, wherein X3 is a quantity of CCs for the CA having numerology 3, Xi is the quantity of CCs for the CA having the numerology i, and wherein Mi corresponds to a limit of a quantity of DCI to be processed by the UE for a single CC for numerology i.

16. The method of claim 10, if the communication protocol is CA with cross-carrier scheduling, the determination of the limit is based on a threshold L for Xi, wherein Xi is a quantity of CCs for the CA having a numerology i.

17. The method of claim 16, wherein the threshold L is determined for each numerology of a plurality of numerologies of carriers for the CA based on a quantity of CCs for the CA having the numerology plus a quantity of other CCs scheduled by the CCs that have the numerology, a limit of a quantity of DCI to be processed by the UE for a single CC for the numerology, a quantity of CCs for the CA, and a scaling factor relative to a single CC DCI limit for the UE.

18. The method of claim 17, wherein the threshold L is determined based on floor$\{Xi/T*Mi*y\}$ per slot of the numerology i of the plurality of numerologies of carriers for the CA, wherein Xi is the quantity of CCs for the CA having the numerology i plus the quantity of other CCs scheduled by the CCs that have the numerology i, wherein Mi corresponds to the limit of the quantity of DCI to be processed by the UE for the single CC for numerology i, wherein T is the quantity of CCs for the CA, wherein y is the scaling factor relative to the single CC DCI limit for the UE, wherein T is equal to a sum of X0+X1+X2+X3, wherein X0 is a quantity of CCs for the CA having numerology 0, wherein X1 is a quantity of CCs for the CA having numerology 1, wherein X2 is a quantity of CCs for the CA having numerology 2, wherein X3 is a quantity of CCs for the CA having numerology 3.

19. The method of claim 16, wherein the threshold L is determined based on variables Xi and Mi per slot of a numerology i of a plurality of numerologies of carriers for the CA, wherein Xi is a quantity of CCs for the CA having the numerology i plus a quantity of other CCs scheduled by the CCs that have the numerology i, and wherein Mi corresponds to a limit of a quantity of DCI to be processed by the UE for a single CC for numerology i.

20. The method of claim 1, wherein the determination of the limit is based on a blind decoding (BD) capability of the UE.

21. The method of claim 20, wherein the determination of the limit is based on a UE capability scaling factor for total BDs in CA relative to single CC BD limit.

22. The method of claim 1, wherein the determination of the limit is based on a quantity of CCs of the one or more slots.

23. A method for wireless communication by a user-equipment (UE), comprising:
   determining a limit, between a reception time of a control channel carrying a downlink control information (DCI) of a plurality of DCI and a time of an event enabled by the DCI, of a quantity of the plurality of DCI in one or more slots based on a configuration for reception of the one or more slots, wherein the event enabled by each of the plurality of DCI is a data transmission, the plurality of DCI scheduling the data transmissions on different channels;
   receiving the one or more slots; and
   decoding the one or more slots in accordance with the determined limit.

24. The method of claim 23, wherein the determined limit of the quantity of the plurality of DCI is subcarrier specific.

25. The method of claim 23, wherein the determination of the limit is based on a communication protocol corresponding to the one or more slots.

26. The method of claim 25, wherein the determination of the limit is based on whether the communication protocol corresponding to the one or more slots is single carrier or carrier aggregation (CA).

27. The method of claim 25, wherein the determination of the limit is based on whether the communication protocol is CA with carriers having the same numerology or CA with carriers having different numerologies.

28. The method of claim 27, wherein, if the communication protocol is CA with carriers having the same numerology, the determination of the limit is based on variables X and M, where X is a number of CCs for the CA, and wherein M corresponds to a limit of a quantity of DCI to be processed by the UE for a single component carrier (CC).

29. The method of claim 28, wherein the determination of the limit is based on a product of X and M further if X is less than or equal to a threshold, or y is greater than or equal to X, wherein y is a scaling factor relative to a single CC DCI limit for the UE.

30. The method of claim 27, wherein if the communication protocol is CA with carriers having the same numerology, the determination of the limit is based on variables y and M, wherein y is a scaling factor relative to a single CC DCI limit for the UE, and wherein M corresponds to a limit of a quantity of DCI to be processed by the UE for a single CC.

31. The method of claim 30, wherein the determination of the limit is based on a product of y and M if X is greater than a threshold and y is less than X, wherein X is a quantity of CCs for the CA.

32. The method of claim 25, wherein the determination of the limit is based on whether the communication protocol is CA with self-scheduling or CA with cross-carrier scheduling.

33. The method of claim 32, if the communication protocol is CA with self-scheduling, the quantity of the plurality of DCI, between the reception time of the control channel carrying the DCI and the time of the event enabled by the DCI, is limited to a threshold L per numerology and per slot of the one or more slots.

34. The method of claim 33, wherein the quantity of the plurality of DCI, between the reception time of the control channel carrying the DCI and the time of the event enabled by the DCI, is limited to the threshold L if a number of CCs of the CA is more than a threshold.

35. The method of claim 34, wherein the quantity of the plurality of DCI, between the reception time of the control channel carrying the DCI and the time of the event enabled by the DCI, is limited to the threshold L further if the number of CCs is greater than y, wherein y is a scaling factor relative to a single CC DCI limit for the UE.

36. The method of claim 35, wherein the threshold L is determined for each numerology of a plurality of numerologies of carriers for the CA based on a quantity of CCs of the numerology, and a total quantity of CCs for the plurality of numerologies.

37. The method of claim 36, wherein the threshold L, for the numerology i of the plurality of numerologies of carriers for the CA, is equal to Floor $\{Xi/(X0+X1+X2+X3)*Mi*y\}$ per slot of the numerology i, wherein X0 is a quantity of CCs for the CA having numerology 0, wherein X1 is a quantity of CCs for the CA having numerology 1, wherein X2 is a quantity of CCs for the CA having numerology 2, wherein X3 is a quantity of CCs for the CA having numerology 3, Xi is a quantity of CCs for the CA having the numerology i, and wherein Mi corresponds to a limit of a quantity of DCI to be processed by the UE for a single CC for numerology i.

38. The method of claim 32, if the communication protocol is CA with cross-carrier scheduling, the determination of the limit is based on a threshold L for Xi CCs of the CA, wherein Xi is a quantity of CCs for the CA having a numerology i.

39. The method of claim 38, wherein the threshold L is determined for each numerology of a plurality of numerologies of carriers for the CA based on a quantity of CCs for the CA having the numerology plus a quantity of other CCs scheduled by the CCs that have the numerology, a limit of a quantity of DCI to be processed by the UE for a single CC for the numerology, a quantity of CCs for the CA, and a scaling factor relative to a single CC DCI limit for the UE.

40. The method of claim 39, wherein the threshold L is determined based on floor$\{Xi/T*Mi*y\}$ per slot of the numerology i of the plurality of numerologies of carriers for the CA, wherein Xi is the quantity of CCs for the CA having the numerology i plus the quantity of other CCs scheduled by the CCs that have the numerology i, wherein Mi corresponds to the limit of the quantity of DCI to be processed by the UE for the single CC for numerology i, wherein T is the quantity of CCs for the CA, wherein y is the scaling factor relative to a single CC DCI limit for the UE, wherein T is equal to a sum of X0+X1+X2+X3, wherein X0 is a quantity of CCs for the CA having numerology 0, wherein X1 is a quantity of CCs for the CA having numerology 1, wherein X2 is a quantity of CCs for the CA having numerology 2, wherein X3 is a quantity of CCs for the CA having numerology 3.

41. The method of claim 40, wherein the threshold L, for the numerology i of the plurality of numerologies of carriers for the CA, is equal to floor$\{Xi/T*Mi*y\}$ per slot of the numerology i if T is greater than a threshold and y is less than T.

42. The method of claim 38, wherein the threshold L is determined based on variables Xi and Mi per slot of a numerology i of a plurality of numerologies of carriers for the CA, wherein Xi is a quantity of CCs for the CA having the numerology i plus a quantity of other CCs scheduled by the CCs that have the numerology i, and wherein Mi corresponds to a limit of a quantity of DCI to be processed by the UE for a single CC for numerology i.

43. The method of claim 23, wherein the determination of the limit is based on a blind decoding (BD) capability of the UE.

44. The method of claim 43, wherein the determination of the limit is based on a UE capability scaling factor for total BDs in CA relative to single CC BD limit.

45. The method of claim 23, wherein the determination of the limit is based on a quantity of CCs of the one or more slots.

46. An apparatus for wireless communications, comprising:
one or more processors; and
memory coupled to the one or more processors, the memory storing instructions for the one or more processors to cause the apparatus to:
determine a limit, between a transmission time of a control channel carrying a downlink control information (DCI) of a plurality of DCI and a time of an event enabled by the DCI, of a quantity of the plurality of DCI in one or more slots based on a configuration associated with transmission of the one or more slots, wherein the event enabled by each of the plurality of DCI is a data transmission, the plurality of DCI scheduling the data transmissions on different channels;
generate the one or more slots in accordance with the determined limit; and
transmit the one or more slots to a user-equipment (UE).

47. An apparatus for wireless communications by a user equipment (UE), comprising:
one or more processors; and
memory coupled to the one or more processors, the memory storing instructions for the one or more processors to cause the UE to:
determine a limit, between a reception time of a control channel carrying a downlink control information (DCI) of a plurality of DCI and a time of an event enabled by the DCI, of a quantity of the plurality of DCI in one or more slots based on a configuration for reception of the one or more slots, wherein the event enabled by each of the plurality of DCI is a data transmission, the plurality of DCI scheduling the data transmissions on different channels;
receive the one or more slots; and decode the one or more slots in accordance with the determined limit.

\* \* \* \* \*